United States Patent
Fischer et al.

(10) Patent No.: US 11,524,516 B2
(45) Date of Patent: Dec. 13, 2022

(54) SECURITY INK SYSTEM

(71) Applicant: Gleitsmann Security Inks GmbH, Berlin (DE)

(72) Inventors: Tobias Fischer, Berlin (DE); Roland Gutmann, Falkensee (DE)

(73) Assignee: Gleitsmann Security Inks GmbH, Berlin (DE)

( * ) Notice: Subject to any disclaimer, the term of this patent is extended or adjusted under 35 U.S.C. 154(b) by 259 days.

(21) Appl. No.: 16/957,919

(22) PCT Filed: Jul. 19, 2019

(86) PCT No.: PCT/EP2019/069594
§ 371 (c)(1),
(2) Date: Jun. 25, 2020

(87) PCT Pub. No.: WO2020/030413
PCT Pub. Date: Feb. 13, 2020

(65) Prior Publication Data
US 2020/0316982 A1     Oct. 8, 2020

(30) Foreign Application Priority Data

Aug. 10, 2018   (EP) ..................................... 18188419

(51) Int. Cl.
*B42D 25/382*     (2014.01)
*B42D 25/21*      (2014.01)
(Continued)

(52) U.S. Cl.
CPC ........... *B42D 25/382* (2014.10); *B42D 25/21* (2014.10); *B42D 25/373* (2014.10);
(Continued)

(58) Field of Classification Search
CPC .... B42D 25/382; B42D 25/21; B42D 25/373; B42D 25/405; G07D 7/1205; C09D 11/037; C09D 11/50; C09K 11/00; C09K 11/08
(Continued)

(56) References Cited

U.S. PATENT DOCUMENTS 10,252,561 B2     4/2019  Richert et al.
10,457,087 B2 *  10/2019  Dorier .................. B42D 25/378
(Continued)

FOREIGN PATENT DOCUMENTS

WO        2004111951 A1    12/2004
WO        2010077600 A1     7/2010
(Continued)

OTHER PUBLICATIONS

Extended European Search Report issued by the European Patent Office dated Apr. 26, 2019 for European patent application No. 18188419.8.
(Continued)

*Primary Examiner* — Daniel A Hess
(74) *Attorney, Agent, or Firm* — Robert Lelkes; Lelkes IP (57) ABSTRACT

A security system, such as a banknote, comprises: i) a substrate, ii) a first ink, which is applied on at least a part of at least one surface of the substrate, wherein the first ink includes at least one IR luminescent dye and/or at least one IR luminescent pigment, and iii) a second non-luminescent ink, which is applied on at least a part of at least one surface of the substrate onto which the first ink is/are applied, wherein the second ink includes at least one non-luminescent IR absorbing pigment and/or a least one non-luminescent IR absorbing dye, wherein the first ink and the second ink at least partially overlap on the at least one surface of the substrate, wherein the second ink is applied in the overlap-
(Continued)

ping area onto the first ink, and wherein the emission spectrum of the first ink and the absorption spectrum of the second ink at least partially overlap.

16 Claims, 2 Drawing Sheets (51) Int. Cl.
| | |
|---|---|
| B42D 25/373 | (2014.01) |
| B42D 25/405 | (2014.01) |
| G07D 7/1205 | (2016.01) |
| C09D 11/037 | (2014.01) |
| C09D 11/50 | (2014.01) |
| C09K 11/00 | (2006.01) |
| C09K 11/08 | (2006.01) |
| B42D 25/23 | (2014.01) |
| B42D 25/24 | (2014.01) |
| B42D 25/25 | (2014.01) |
| B42D 25/26 | (2014.01) |
| B42D 25/29 | (2014.01) |
| C08K 3/11 | (2018.01) |
| C08K 5/56 | (2006.01) |

(52) U.S. Cl.
CPC .......... *B42D 25/405* (2014.10); *C09D 11/037* (2013.01); *C09D 11/50* (2013.01); *C09K 11/00* (2013.01); *C09K 11/08* (2013.01); *G07D 7/1205* (2017.05); *B42D 25/23* (2014.10); *B42D 25/24* (2014.10); *B42D 25/25* (2014.10); *B42D 25/26* (2014.10); *B42D 25/29* (2014.10); *C08K 3/11* (2018.01); *C08K 5/56* (2013.01); *C08K 2201/005* (2013.01); *G07D 2207/00* (2013.01)

(58) Field of Classification Search
USPC .......................................................... 235/494
See application file for complete search history.

(56) References Cited

U.S. PATENT DOCUMENTS

| | | |
|---|---|---|
| 2006/0131425 A1 | 6/2006 | Stenzel et al. |
| 2010/0140501 A1 | 6/2010 | Lawandy |
| 2015/0376422 A1 | 12/2015 | Lefebvre et al. |
| 2019/0126659 A1* | 5/2019 | Dorier .................. C09D 11/101 |
| 2019/0126660 A1 | 5/2019 | Doier et al. |

FOREIGN PATENT DOCUMENTS

| | | |
|---|---|---|
| WO | 2017/102722 A1 | 6/2017 |
| WO | 2017/102723 A1 | 6/2017 |

OTHER PUBLICATIONS

Notification of Transmittal of the International Search Report and the Written Opinion issued by the European Patent Office dated Oct. 25, 2019 acting as the international searching authority in international patent application No. PCT/EP2019/06594.

* cited by examiner

SECURITY INK SYSTEM

The present invention relates to security ink system or to a security article, respectively, i.e. to a system comprising at least one security substrate, such as a banknote paper, onto which at least one security ink is printed.

Security articles, such as banknotes, bank cards, credit cards, driving licenses and the like, must comprise one or more security features, so that any skilled person is able to reliably determine, whether it is genuine or forged. This is a prerequisite for allowing a recipient of for instance a banknote, such as a cashier at a supermarket, to decide, whether he accepts it or not. In addition, it allows employees of a bank to evaluate the genuineness of banknotes, before filling it into a cash machine or transfer it into the cash desk. Moreover, the existence of such security features avoids or at least significantly hinders unauthorized persons to copy or reengineering the respective article. Furthermore, security features even allow a cash machine or a banknote counting machine to assure that the banknotes are properly aligned during their transport through the machine, which is a prerequisite for reliably counting the number of banknotes.

Particular valuable security articles, such as banknotes, are required to have several different security features and it is preferred that they have as many of different security features as possible.

Examples for security features are security images, which comprise an image being invisible or otherwise undetectable under ambient conditions, but which are rendered visible or detectable upon application of e.g. UV radiation. Alternatively, the image on the banknote or credit card may have a first color under ambient conditions, which is changed into a second color being different from the first color upon application of e.g. UV radiation.

An often used security feature is the application of a printing ink onto a part of the surface of a security banknote paper, wherein the printing ink has certain characteristics under infrared (IR) radiation. For instance, the specific IR active ink is applied onto a part of the surface of the security banknote paper in the form of a small pattern, of a barcode, of a single line, of one dot or of several dots. In particular, for this purpose ink is used, which absorbs IR radiation, so that it reduces the IR radiation reflectance of the part of the surface of the banknote, where the specific IR active ink is applied, compared to those areas of the surface of the banknote, where the specific IR active ink is not applied. By measuring the IR reflectance at a wavelength, at which the specific ink absorbs IR radiation, at different locations of the banknote surface, some of which being in the area where the security image is supposed to be and some of which being outside this area, it can be reliably decided, whether this security feature is present on the evaluated banknote or not. In the case of the absence of the specific ink, the locations in the area where the security image is supposed to be and those locations outside this area would have the same or at least essentially the same IR radiation reflectance, whereas in the case of the presence of the specific ink, the locations in the area where the security image is supposed to be would have a significantly lower IR radiation reflectance as those locations outside this area. This kind of security feature is quite helpful, but not completely satisfying, when a high standard of protection against forgery is required.

Therefore, it has ben already supposed to combine such IR active inks with other security inks, in order to improve the level of protection against forgery. However, combining IR active inks on certain areas of the security article with other inks, such as UV active inks, on other areas of the security article requires that the security article is analyzed with different measuring methods, such as by measuring IR reflectance on the one hand and a UV characteristic on the other hand.

In view of this, the object underlying the present invention is to provide a security article, such as a printed security paper, such as a banknote or a verification certificate, which has an improved level of protection against forgery, but which can be nevertheless evaluated as genuine or forged in a simple manner and by preferably only requiring one measuring method.

In accordance with the present invention, this objective is achieved by providing a system for a security article comprising:
  i) a substrate,
  ii) a first ink, which is applied on at least a part of at least one surface of the substrate, wherein the first ink includes at least one IR luminescent dye and/or at least one IR luminescent pigment, and
  iii) a second preferably non-luminescent ink, which is applied on at least a part of at least one surface of the substrate onto which the first ink is/are applied, wherein the second ink includes at least one preferably non-luminescent IR absorbing pigment and/or at least one preferably non-luminescent IR absorbing dye,
wherein the first ink and the second ink at least partially overlap on the at least one surface of the substrate, wherein the second ink is applied in the overlapping area onto the first ink, and wherein the emission spectrum of the first ink and the absorption spectrum of the second ink at least partially overlap.

By applying two different inks onto the surface of a substrate, one of which including at least one IR luminescent dye and/or at least one IR luminescent pigment, i.e. an IR emitting dye and/or pigment, such as an IR fluorescent dye and/or pigment, and the other non-luminescent ink including at least one non-luminescent IR absorbing pigment and/or non-luminescent IR at least one absorbing dye, the security article is provided with two different security features (in addition to the other typical security features present in banknotes, such as a security thread, a clear window, a shadow image or the like), thus significantly improving the level of protection against forgery thereof. In addition, by applying the first ink and the second ink so that they at least partially overlap on the at least one surface of the substrate, by applying the second ink in the overlapping area onto the first ink and by selecting the pigments and/or dyes of the first and second ink so that the emission spectrum of the first ink and the absorption spectrum of the second ink at least partially overlap in the IR range, it is achieved that the two different security features can be reliably identified with one measuring method. It is in particular not necessary to measure the emission characteristics of the first ink and the absorption characteristics of the second ink (i.e. to apply two different measuring methods). On the contrary, it is sufficient for reliably identifying both security features to measure the emission characteristics of the system at a location above the overlap area of the first ink and the second ink. This is due to the fact that the emission spectrum of the lower first ink and the absorption spectrum of the upper second ink influence each other. In the overlapping area of both inks, the lower first ink emits, when appropriately excited, IR radiation, whereas the upper second ink absorbs a part of the IR radiation emitted by the lower layer, because the emission spectrum of the first ink and the absorption spectrum of the second ink at least partially overlap in the IR wavelength range. Therefore, the emission detected above the overlapping area of both inks is the difference of the IR radiation emitted by the lower first ink and the part thereof absorbed by the upper second ink. Since in the non-luminescent second ink a non-luminescent IR absorbing pigment and/or non-luminescent IR absorbing dye is used, i.e. since the second ink is not luminescent and thus does not emit any luminescence radiation after having been excited, the difference of the IR radiation emitted by the lower first ink and the part thereof absorbed by the upper second ink is not falsified by any further radiation. For instance, if the lower first ink emits IR radiation in a range of 900 to 1,100 nm, whereas the upper higher second in absorbs light at 950 to 1,000 nm, the spectrum detected above the overlapping area (for instance measured between 800 and 1,500 nm) corresponds to the emission spectrum of the lower first ink respectfully reduced in the 950 to 1,000 nm wavelength range by the portion of IR radiation absorbed by the upper second ink. Thus, a characteristic spectrum is measured above the overlapping area of both inks which is significantly different from the emission spectrum of the lower first ink so that the presence of both layers can be simply and reliably concluded. Alternatively, to measuring a spectrum, it is sufficient to measure at one or more locations above the overlapping area the emission at, for instance, at three different wavelengths of e.g. in this exemplary case at 950 nm, at 970 nm and at 1,000 nm. Since the IR radiation emitted at these wavelengths is differently reduced at each of these three wavelengths due to the upper second ink absorbing different amounts of IR radiation at these three wavelengths, three characteristic emission values are measured at the three different wavelengths, which allow to simply and reliably conclude, whether the measured system includes both security features or not. Still alternatively, it is possible to measure the emission at one wavelength at one or more locations above the overlapping area at, for instance, two or three different excitation wavelengths. Since the emission spectrum of the first ink depends on the excitation wavelength, the first layer will emit at the different excitation wavelengths different emission spectra so that the total emission influenced by the IR absorbance of the second ink measured above the overlapping area of both inks will differ. It is even simply possible with the present invention to identify both security features space-resolved. For instance, the lower first ink as well as the upper second ink are applied onto the substrate in form of the squares, which are not shifted in the width direction, but which are shifted in the longitudinal direction of for example a banknote paper (with the upper second ink square being shifted to the right side). Then, from left to right the following sections exist on the substrate: a left first section without first ink and without second ink, right therefrom a second section with only first ink, but without second ink, right therefrom a third section with first ink and with second ink, right therefrom a fourth section with only second ink, but without first ink, and right therefrom a fifth section without first ink and without second ink. By measuring the IR emission at one or more specific IR wavelengths in each of these sections, a space-resolved detection of both security features is simply and reliably possible. All in all, a security system in accordance with the present invention does not only has a high level of protection against forgery, but can be also evaluated as genuine or forged in a simple manner and by preferably only requiring one measurement.

As set out above, the second ink is non-luminescent and thus in particular non-fluorescent as well as non-phosphorescent.

In accordance with the present invention, the emission spectrum of the first ink and the absorption spectrum of the second ink at least partially overlap. Preferably, the emission spectrum of the first ink and the absorption spectrum of the second ink at least partially overlap in the infrared region and more preferably in the near infrared region, such as between 780 and 2,500 nm. Particular good results are obtained, when the emission spectrum of the first ink and the absorption spectrum of the second ink at least partially overlap in a wavelength range of between 780 and 1,500 nm, more preferably of between 800 and 1,200 nm, even more preferably of between 900 and 1,100 nm and most preferably of between 950 and 1,050 nm.

Therefore, it is in particular preferred that the emission spectrum of the first ink has at least one peak between 780 and 2,500 nm, more preferably between 780 and 1,500 nm, still more preferably between 800 and 1,200 nm, even more preferably between 900 and 1,100 nm and most preferably between 950 and 1,050 nm. The emission spectrum of the first ink is at least mainly influenced and preferably only influenced by the at least one IR luminescent dye and/or at least one IR luminescent pigment, since it is preferred that all other components of the first ink except the at least one IR luminescent dye and/or at least one IR luminescent pigment do not emit radiation in this wavelength range, i.e. that they are IR transparent. However, since it cannot be excluded that one or more of the other components at least slightly emit in a specific part of this wavelength range, it is subsequently referred to the emission of the first ink, even if that of the at least one IR luminescent dye and/or at least one IR luminescent pigment included therein is meant.

In accordance with a particular preferred embodiment of the present invention, the emission spectrum or at least one peak of the emission spectrum of the first ink, respectively, is broader than the absorption spectrum or at least one peak of the second ink, respectively. This allows to significantly reduce the emission of only a part of the peak of the first ink by the overlaying second ink, whereas the remaining part of the peak is not influenced. This allows to get a strong contrast. In contrast thereto, the emission of the peak of the emission spectrum of the first ink would be reduced over its complete width, if the peak of the emission spectrum of the first ink would be more narrow than the peak of the IR absorption spectrum of the second ink and if both spectrum would completely overlap. Preferably, the emission spectrum of the first ink has at least one peak, wherein the at least one peak of the emission spectrum of the first ink has a width at half-height of at least 75, preferably of at least 100 nm and more preferably of at least 120 nm. The width at half-height is defined or determined, respectively, in this connection by measuring the height of the peak crest above the baseline, dividing it by two, and then measuring the span between the rising and falling sides of the peak where a line crosses the half-height points of the rising and falling sides of the peak.

For measuring the emission of the ink layers, the at least one IR luminescent dye and/or at least one IR luminescent pigment included in the first ink must be excited by applying an appropriate excitation spectrum or excitation wavelength, respectively. In order to avoid that the measurement of the emission of the ink layers is interfered by the excitation radiation, it is suggested in a further development of the idea of the present invention that the wavelength(s) of the excitation radiation is sufficiently different from the emission wavelength(s) of the at least one IR luminescent dye and/or at least one IR luminescent pigment included in the first ink and sufficiently different from the absorption wavelength(s) of the at least one non-luminescent IR absorbing pigment and/or at least one non-luminescent IR absorbing dye of the second ink. On account of these reasons, it is preferred that the at least one IR luminescent dye and/or the at least one IR luminescent pigment of the first ink has an excitation wavelength of 200 to 700 nm, preferably of 400 to 600 nm and more preferably of 430 to 520 nm, which is sufficiently distant from the IR wavelength range.

In accordance with the present invention, the emission spectrum of the first ink and the absorption spectrum of the second non-luminescent ink at least partially overlap. Therefore, it is preferable that the absorption spectrum of the second ink has at least one peak between 780 and 2,500 nm, preferably between 780 and 1,500 nm, more preferably between 800 and 1,200 nm, even more preferably between 875 and 1,075 nm and most preferably between 925 and 1,025 nm. The absorption spectrum of the second non-luminescent ink is at least mainly influenced and preferably only influenced by the at least one non-luminescent IR absorbing pigment and/or a least one non-luminescent IR absorbing dye, since it is preferred that all other components of the second ink except the at least one IR absorbing pigment and/or a least one IR absorbing dye do not absorb radiation in this wavelength range, i.e. that they are IR transparent. However, since it cannot be excluded that one or more of the other components at least slightly absorb in a specific part of this wavelength range, it is subsequently referred to the absorption of the second ink, even if that of the at least one IR absorbing pigment and/or a least one IR absorbing dye included therein is meant.

As set out above, the emission spectrum or at least one peak, respectively, of the emission spectrum of the first ink is broader than the absorption spectrum or at least one peak, respectively, of the second ink in accordance with a particular preferred embodiment of the present invention. In view of this, it is preferred that the at least one peak of the absorption spectrum of the second ink has a width at half-height of less than 75 nm, more preferably of at less than 60 nm and most preferably of less than 50 nm. Again, the width at half-height is defined or determined, respectively, in this connection by measuring the height of the peak crest above the baseline, dividing it by two, and then measuring the span between the rising and falling sides of the peak where a line crosses the half-height points of the rising and falling sides of the peak.

In order to particularly characteristically influence the emission spectrum of the first ink, it is suggested in a further development of the idea of the present invention that the crest of the at least one peak of the absorption spectrum of the second ink is shifted in relation to the crest of the at least one peak of the emission spectrum of the first ink by 10 to 400 nm, preferably by 10 to 100 nm, more preferably by 15 to 50 nm and most preferably by 20 to 40 nm.

Each of the first ink and of the second ink may be independently from each other applied onto the substrate in any two-dimensional form, such as for example in the form of a line, of a dot, of a raster or of a pattern.

Both, the first ink and the second ink may be applied onto the surface of the substrate in the same form and completely overlapping each other.

However, as set out above it is preferred that both inks only partial overlap so as to allow to space-resolved detect both security features. Therefore, it is preferred that the first ink and the second ink only partially overlap each other, wherein both inks may be applied onto the surface of the substrate in the same form or in a different form.

In principle, the present invention is not limited concerning the kind of substrate, as long as the first and second ink are formulated so that they can be applied onto the surface of the substrate. For instance, the substrate may be a paper, a polymer foil or a composite comprising at least one paper layer and at least one polymer foil. More specifically, the substrate may be selected from the group consisting of security papers, polycarbonate foils, polyethylene terephthalate foils, composites of a lower security paper and an upper polymer foil, composites of a lower polymer foil and an upper security paper, composites of a lower security paper, an intermediate polymer foil and an upper security paper, composites of a lower polymer foil, an intermediate security paper and an upper polymer foil and hybrids of a security paper, in which a part of the security paper is replaced by a polymer foil.

In accordance with a further preferred embodiment of the present invention, the substrate does not emit radiation at a wavelength between at least 950 and 1,050 nm, preferably at a wavelength between at least 900 and 1,100 nm, more preferably at a wavelength between at least 800 and 1,200 nm, even more preferably at a wavelength between at least 780 and 1,500 nm and most more preferably at a wavelength between at least 780 and 2,500 nm. This assures that the emission spectrum measured for identifying the security features is not negatively influenced by the substrate.

Concerning the kind of IR luminescent dye, the present invention is not particularly restricted. Thus, any dye may be used which emits—upon excitation—radiation in the IR region. More specifically, the IR luminescent dye may be an IR fluorescent dye or an IR phosphorescent dye. Examples therefore are IR luminescent dyes being selected from the group consisting of coumarin, coumarin derivatives, [1,3]dioxolo[4,5-f][1,3]benzodioxol, [1,3]dioxolo[4,5-f][1,3]benzodioxol derivatives, cyanine dyes and arbitrary combinations of two or more of the aforementioned dyes. Suitable examples for cyanine dyes are in particular cyanine dyes Cy7 and Cy7.5.

Likewise to this, the present invention is not particularly limited with regard to the kind of IR luminescent pigment so that any pigment may be used which emits—upon excitation—radiation in the IR region. For instance, the first ink may include an IR luminescent pigment, which is a lanthanoid complex, preferably calcium sulfide doped with one or more rare earth metals or calcium sulfide doped with or with one or more lanthanoids and more preferably calcium sulfide doped with europium and thallium. Good results are in particular achieved, when the IR luminescent pigment has an average particle size of 10 nm to 2 pm and more preferably of 50 to 500 nm.

Preferably, the total concentration of IR luminescent dye and IR luminescent pigment in the first ink is 1 to 40% by weight and more preferably 5 to 20% by weight.

In dependency from the substrate, the first ink may be formulated as printing ink, such as one being selected from the group consisting of offset inks, intaglio inks, gravure inks, flexographic inks and screen inks.

In addition to the at least one IR luminescent dye and/or at least one IR luminescent pigment, the first ink includes a binder. For instance, the first ink may include a binder, which is selected from the group consisting of polyesters, polyethers, polyurethanes, polyamides, polyacrylates, maleinate resins, collophonium resins, ketone resins, alkyd resins, collophonium modified phenolic resins, hydrocarbon resins, silicates, silicones, silanes, phenolic resins, urea resins, melamine resins, polyterpene resins, polyvinylalcohols, polyvinylacetates, polyvinylchloride, polyvinylethers, polyvinylpropionates, polymethacrylates, polystyrenes, polyolefines, coumarone-indene resins, aromatic formaldehydre resins, carbamide acid resins, sulfonamide resins, chlorinated resins, nitrocellulose, CAB (cellulose acetate butyrate), CAP (cellulose acetate propionate), cellulose compounds, rubbers, radiation curing resins and arbitrary combinations of two or more of the aforementioned binders.

In accordance with a particular preferred embodiment of the present invention, the first ink comprises:

i) 1 to 40% by weight and preferably 5 to 20% by weight of IR luminescent dye(s) and/or IR luminescent pigment(s), ii) 10 to 40% by weight and preferably 20 to 30% by weight of one or more binders, iii) 20 to 60% by weight and preferably 30 to 40% by weight of one or more solvents, wherein the solvent is preferably selected from the group of vegetable oils, mineral oils, wood oils and arbitrary combinations of two or more of the aforementioned solvents, and iv) optionally 1 to 10% by weight of one or more additives being selected from the selected from the group consisting of rheological additives, adhesives, defoamers, slip additives, anti-corrosion additives, gloss additives, waxes, wetting agents, curing agents, chelating agents, photoinitiators, inhibitors, desiccants, stabilizers, emulsifiers, pH adjustment additives, abrasion resistance additives, plasticizers, antistatic additives, preservatives, light protection agents, matting agents and arbitrary combinations of two or more of the aforementioned additives, wherein the sum of the components is 100% by weight.

The thickness of the first ink depends on the application technique or printing technique, respectively. Thus, the thickness of the first ink may be 1 to 3 μm in the case of an offset printing ink, 1 to 10 μm in the case of an intaglio or gravure printing ink, 1 to 8 μm for a flexographic printing ink and 1 to 10 μm for a screen printing ink.

As set out above, the second ink is non-luminescent, i.e. it does not contain any luminescent component and thus neither a fluorescent nor phosphorescent component.

The present invention is not particularly limited concerning the kind of the at least one non-luminescent IR absorbing pigment included in the second ink. Thus, any pigment may be used which absorbs radiation in the IR region, but which is non-luminescent. More specifically, the non-luminescent IR absorbing pigment may be a transition metal compound, such as a transition metal salt. More preferably, the at least one non-luminescent IR absorbing pigment is a transition metal salt with an anion being selected from the group consisting of Ti anions, V anions, Cr anions, Mn anions, Fe anions, Co anions, Ni anions, Co anions, La anions, Zr anions, Ce anions, Y anions and Mo anions and even more preferably a transition metal salt with an cation being selected from the group consisting of borides, phosphates, hydrogenophosphates, pyrophosphates, metaphosphates, polyphosphates, silicates, condensed polysilicates, titanates, condensed polytitanates, carbonates, fluorides, oxides and hydroxides, wherein the non-luminescent IR luminescent pigment preferably has an average particle size of 10 nm to 10 μm and more preferably of 50 nm to 2 μm.

Particularly preferred examples for non-luminescent IR absorbing pigments are those selected from the group consisting of indium tin oxide, titanium nitride, zirconium nitride, molybdenum metal, copper chromate, lanthanum hexaboride, neodymium oxide, neodymium chloride, dysprosium oxide and praseodymium oxide, copper (II) fluoride, copper hydroxyfluoride, copper hydroxide, copper phosphate, anhydrous copper phosphate, the basic copper (II) phosphates, cornetite, pseudomalachite, turquoise, copper (II) pyrophosphate, anhydrous copper(II) pyrophosphate, copper(II) metaphosphate, iron (II) fluoride, anhydrous iron (II) fluoride, iron (II) phosphate, lithium iron (II) phosphate, sodium iron (II) phosphate, iron (II) silicates, iron(II) carbonate, nickel(II) phosphate, titanium(III) metaphosphate anapaite, wagnerite, lanthan hexaboride, cerium hexaborid, yttrium hexaboride, molybdenum boride, zirconium diboride, titaniumboride, vanadium boride, chromium diboride and arbitrary combinations of two or more of the aforementioned compounds.

Preferably, the non-luminescent IR luminescent pigment preferably has an average particle size of 10 nm to 10 μm and more preferably of 50 nm to 2 μm.

As set out above, alternatively to or in addition to the at least one non-luminescent IR absorbing pigment, the second ink further may include an at least one non-luminescent IR absorbing dye. The non-luminescent IR absorbing dye may be selected from the following compounds:

wherein
- M is a metal selected from a group 3-10 (Group IIIB-VIII) element or a lanthanide,
- $R_1$ is selected from hydrogen, phosphonate, sulphonate, nitro, halo, cyano, thiocyano, thioalkyl, thioaryl, alkyl, alkoxy, aryl, aryloxy, amines, substituted amines and substituted aryl,
- one of $R_2$ and $R_3$ is oxygen and the other of $R_2$ and $R_3$ is NO,
- n is a number corresponding to half the co-ordination number of the metal M,
- each L and L' is independently a ligand complexed to the metal M and
- y is a number corresponding to the co-ordination number of the metal M.

Preferably, the total concentration of non-luminescent IR absorbing pigment(s) and non-luminescent IR absorbing dye(s) in the second ink is 1 to 60% by weight and preferably 5 to 20% by weight.

In dependency from the substrate, the second ink may be formulated as printing ink, such as one being selected from the group consisting of offset inks, intaglio inks, gravure inks, numbering inks, flexographic inks and screen inks.

In addition to the at least one non-luminescent IR absorbing and/or a least one non-luminescent IR absorbing dye, the second ink includes a binder. For instance, the second ink may include a binder, which is selected from the group consisting of polyesters, polyethers, polyurethanes, polyamides, polyacrylates, maleinate resins, collophonium resins, ketone resins, alkyd resins, collophonium modified phenolic resins, hydrocarbon resins, silicates, silicones, silanes, phenolic resins, urea resins, melamine resins, polyterpene resins, polyvinylalcohols, polyvinylacetates, polyvinylchloride, polyvinylethers, polyvinylpropionates, polymethacrylates, polystyrenes, polyolefines, coumarone-indene resins, aromatic formaldehyde resins, carbamide acid resins, sulfonamide resins, chlorinated resins, nitrocellulose, CAB (cellulose acetate butyrate), CAP (cellulose acetate propionate), cellulose compounds, rubbers, radiation curing resins and arbitrary combinations of two or more of the aforementioned binders.

In accordance with a particular preferred embodiment of the present invention, the second ink comprises:
i) 1 to 60% by weight and preferably 5 to 20% by weight of non-luminescent IR absorbing pigment(s) and/or non-luminescent IR absorbing dye(s),
ii) 10 to 40% by weight and preferably 20 to 30% by weight of one or more binders,
iii) 20 to 60% by weight and preferably 30 to 40% by weight of one or more solvents, wherein the solvent is preferably selected from the group of vegetable oils, mineral oils, wood oils and arbitrary combinations of two or more of the aforementioned solvents, and
iv) optionally 1 to 10% by weight of additive(s) selected from the selected from the group consisting of rheological additives, adhesives, defoamers, slip additives, anti-corrosion additives, gloss additives, waxes, wetting agents, curing agents, chelating agents, photoinitiators, inhibitors, desiccants, stabilizers, emulsifiers, pH adjustment additives, abrasion resistance additives, plasticizers, antistatic additives, preservatives, light protection agents, matting agents and arbitrary combinations of two or more of the aforementioned additives, wherein the sum of the components is 100% by weight.

The thickness of the second ink depends on the application technique or printing technique, respectively. Thus, the thickness of the second ink may be 1 to 3 µm in the case of an offset printing ink, 1 to 10 µm in the case of an intaglio or gravure printing ink, 1 to 8 µm for a flexographic printing ink and 1 to 10 µm for a screen printing ink.

If necessary, the system in accordance with the present invention may comprise a varnish, which is applied at least in the overlapping area of the first and second inks on the second ink.

Particular preferred examples for systems in accordance with the present invention are:
the first ink is formulated as offset ink and the second ink is formulated as intaglio ink or
the first ink is formulated as offset ink and the second ink is formulated as intaglio ink, wherein the system further comprises a varnish, which is applied at least in the overlapping area of the first and second inks on the second ink, or
the first ink is formulated as offset ink and the second ink is formulated as die screen ink or
the first ink is formulated as offset ink and the second ink is formulated as die screen ink, wherein the system further comprises a varnish, which is applied at least in the overlapping area of the first and second inks on the second ink, or
the first ink is formulated as screen ink and the second ink is formulated as offset ink or
the first ink is formulated as screen ink and the second ink is formulated as offset ink, wherein the system further comprises a varnish, which is applied at least in the overlapping area of the first and second inks on the second ink.

In a further development of the idea of the present invention, it is suggested that the second ink comprises as a further security feature an embossing on its surface.

The system in accordance with the present invention may be used for any security article. Suitable examples therefore are those selected from the group consisting of banknotes, checks, bank and credit cards, check cards, passports, chip cards, driving licences, verification certificates, entrance tickets, stamps, train and airplane tickets, telephone carts and seals.

In accordance with a further aspect, the present invention relates to a method for preparing a system in accordance with any of the preceding claims, which comprises the following steps:
a) providing a substrate,
b) applying a first ink on at least a part of at least one surface of the substrate, wherein the first ink includes at least one IR luminescent dye and/or at least one IR luminescent pigment, and
c) applying a non-luminescent second ink on at least a part of at least one surface of the substrate, wherein the second ink includes at least one non-luminescent IR absorbing pigment and/or a least one non-luminescent IR absorbing dye, wherein the IR emission spectrum of the first ink and the absorption spectrum of the second ink at least partially overlap,
wherein the first and second inks are applied in steps b) and c) so that the first ink and the second ink at least partially overlap, wherein the second ink is applied in the overlapping area onto the first ink.

Another aspect of the present invention is the provision of a method for evaluating the genuineness of a security document comprising the aforementioned system, wherein the method comprises the steps of irradiating the security document with a wavelength being able to excite the IR luminescent dye and/or IR luminescent pigment included in the first ink and measuring the emission of the system at at least one wavelength, at which the IR luminescent dye and/or IR luminescent pigment included in the first ink emits IR radiation.

Preferably, at least a part of the measurement of the emission of the system is measured during at least a part of the time period, during which the security document is irradiated. This allows to quickly perform the measurement, because it has not to be waited until the irradiation is stopped. Measuring the emission of the system at least during a part of the time period, during which the security document is irradiated, means that at least 50%, preferably at least 75% and more preferably at least 90% of the emission measurement time period falls within the time period, during which the security document is irradiated. Most preferably, the whole measurement of the emission is made during the time period, during which the security document is irradiated.

Preferably, the emission of the system is measured at two to ten different wavelengths, preferably at three to five different wavelengths, wherein at all of these wavelengths the at least one IR luminescent dye and/or the at least one IR luminescent pigment included in the first ink emits IR radiation, and wherein at at least one of these wavelengths the non-luminescent IR absorbing pigment and/or a least one non-luminescent IR absorbing dye absorbs IR radiation.

In order to allow a large difference in the emission measured for the system at the different wavelengths it is further preferred that the non-luminescent IR absorbing pigment and/or a least one non-luminescent IR absorbing dye does not absorb IR radiation at at least one of the wavelengths at which the emission is measured or that the absorption of the IR absorbing pigment and/or a least one IR absorbing dye is sufficiently lower, preferably 50% or more lower than the IR emission of the IR luminescent pigment.

In accordance with an alternative embodiment of the present invention, for measuring the emission of the system an emission spectrum is measured for a wavelength range of at least 950 to 1,050 nm, preferably of at least 900 to 1,100 nm, more preferably of at least 800 to 1,200 nm, even more preferably of at least 780 to 1,500 nm and most more preferably of at least 780 to 2,500 nm.

In accordance with an alternative embodiment of the present invention, the security document may be irradiated with at least two different excitation wavelengths and preferably with at least three different excitation wavelengths each of which being able to excite the IR luminescent dye and/or IR luminescent pigment included in the first ink and the emission of the system is measured at one wavelength, at which the IR luminescent dye and/or IR luminescent pigment included in the first ink emits IR radiation. Since the emission spectrum of the first ink depends on the excitation wavelength, the first layer will emit at the different excitation wavelengths different emission spectra so that the total emission influenced by the IR absorbance of the second ink measured above the overlapping area of both inks will differ.

Subsequently, the present invention is described with reference to the appended figures.

Figure 1A:
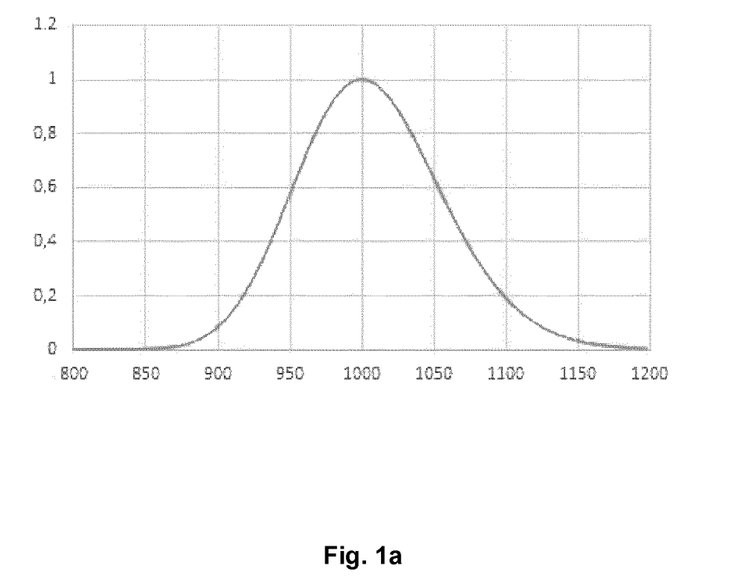
FIG. 1a shows the emission spectrum of a first ink including an IR luminescent dye.

FIG. 1a shows the emission spectrum of a first ink including an IR luminescent dye after having been excited at a wavelength of for instance 580 nm. The emission spectrum has a peak with a crest at about 1,000 nm and a width at half-height of about 175 nm.

Figure 1B:
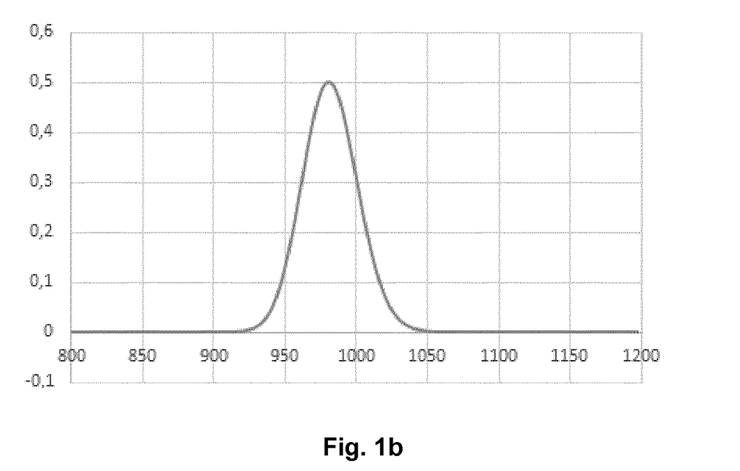
FIG. 1b shows the IR absorption spectrum of a second ink including an IR absorbing pigment.

The IR absorption spectrum of a second ink including a non-luminescent IR absorbing pigment shown in FIG. 1b has a peak with a crest at about 980 nm and a width at half-height of about 40 nm.

Figure 1C:
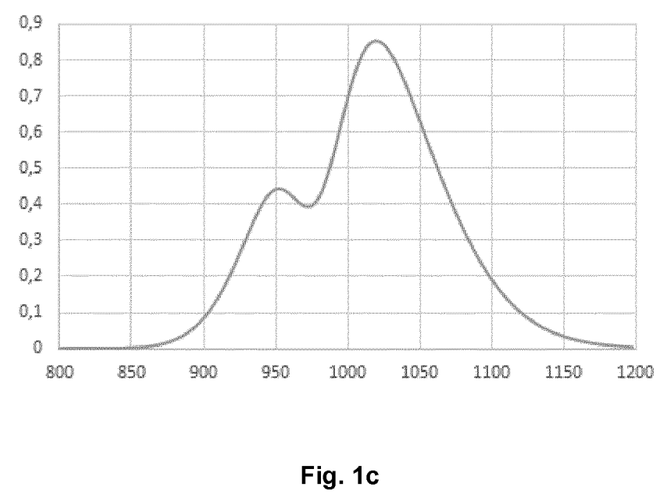
FIG. 1c shows the emission spectrum measured of a system in accordance with one embodiment of the present including the first ink of FIG. 1a and the second ink of FIG. 1b above the first ink.

The system comprising onto a substrate the first ink and above the first ink the second ink with the spectra as shown in FIGS. 1a and 1b shows, if measured from above the second ink, an emission spectrum as shown in FIG. 1c. This spectrum is the difference between the spectra shown in FIGS. 1a and 1b, since the non-luminescent IR absorbing pigment of the second layer absorbs IR light (but does not emit any light, which may interfere with the emission spectrum of the IR luminescent dye of the first ink) and thus reduces at the absorbed wavelengths a respective part of the emission spectrum of the IR luminescent dye of the first ink and thus subtracts the respective amount of emission at the respective wavelengths from the emission spectrum of the IR luminescent dye of the first ink. Thus, a genuine system of this embodiment would have above the second ink at 980 nm an emission corresponding to 0.5 relative units as shown in FIG. 1c. However, a forged system only comprising the first ink would have at 980 nm a respective emission corresponding to 0.9 relative units. In turn, a forged system only comprising the second ink or none of the first and second ink would have no emission at all at 980 nm.

If both inks would be applied onto each other so as to only partially overlap, above the area of only the first ink at 980 nm a respective emission corresponding to 0.9 relative units would be measured, above the area of the first and second ink at 980 nm a respective emission corresponding to 0.5 relative units would be measured and above the area of only the second ink at 980 nm no emission would be measured.

All in all, the system in accordance with the present invention allows to reliably differ a genuine from a forged system.

The invention claimed is:

1. A system comprising:
   i) a substrate,
   ii) a first ink, which is applied on at least a part of at least one surface of the substrate, wherein the first ink includes at least one IR luminescent dye and/or at least one IR luminescent pigment, and
   iii) a second non-luminescent ink, which is applied on at least a part of at least one surface of the substrate onto which the first ink is/are applied, wherein the second ink includes at least one non-luminescent IR absorbing pigment and/or a least one non-luminescent IR absorbing dye,
   wherein the first ink and the second ink at least partially overlap on the at least one surface of the substrate, wherein the second ink is applied in the overlapping area onto the first ink, and wherein the emission spectrum of the first ink and the absorption spectrum of the second ink at least partially overlap.

2. The system in accordance with claim 1, wherein the emission spectrum of the first ink has at least one peak between 780 and 2,500 nm the at least one peak of the emission spectrum of the first ink has a width at half-height of at least 75 nm.

3. The system in accordance with claim 1, wherein the absorption spectrum of the second ink has at least one peak between 780 and 2,500 nm, wherein the at least one peak of the absorption spectrum of the second ink has a width at half-height of less than 75 nm.

4. The system in accordance with claim 1, wherein the crest of the at least one peak of the absorption spectrum of the second ink is shifted in relation to the crest of the at least one peak of the emission spectrum of the first ink by 10 to 400 nm.

5. The system in accordance with claim 1, wherein the first ink includes an IR luminescent dye, which is selected from the group consisting of coumarin, coumarin derivatives, [1,3]dioxolo[4,5-f][1,3]benzodioxol, [1,3]dioxolo[4, 5-f][1,3]benzodioxol derivatives, cyanine dyes and arbitrary combinations of two or more of the aforementioned dyes.

6. The system in accordance with claim 1, wherein the first ink includes an IR luminescent pigment, which is a lanthanoid complex, wherein the IR luminescent pigment has an average particle size of 10 nm to 2 μm.

7. The system in accordance with claim 1, wherein the total concentration of IR luminescent dye and IR luminescent pigment in the first ink is 1 to 40% by weight.

8. The system in accordance with claim 1, wherein the second ink includes a non-luminescent IR absorbing pigment, which is a transition metal compound, wherein the IR luminescent pigment has an average particle size of 10 nm to 10 μm.

9. The system in accordance with claim 1, wherein the second ink includes a non-luminescent IR absorbing dye, which is selected from the following compounds:

wherein

M is a metal selected from a group 3-10 (Group IIIB-VIII) element or a lanthanide, $R_1$ is selected from hydrogen, phosphonate, sulphonate, nitro, halo, cyano, thiocyano, thioalkyl, thioaryl, alkyl, alkoxy, aryl, aryloxy, amines, substituted amines and substituted aryl, one of $R_2$ and $R_3$ is oxygen and the other of $R_2$ and $R_3$ is NO, n is a number corresponding to half the co-ordination number of the metal M, each L and L' is independently a ligand complexed to the metal M and y is a number corresponding to the co-ordination number of the metal M.

10. The system in accordance with claim 1, wherein the total concentration of non-luminescent IR absorbing pigment(s) and non-luminescent IR absorbing dye(s) in the second ink is 1 to 40% by weight.

11. The system in accordance with claim 1, wherein second ink comprises:
   i) 1 to 60% by weight of non-luminescent IR absorbing pigment(s) and/or non-luminescent IR absorbing dye (s),
   ii) 10 to 40% by weight of one or more binders, and
   iii) 20 to 60% by weight of one or more solvents, wherein the solvent is selected from the group of vegetable oils, mineral oils, wood oils and arbitrary combinations of two or more of the aforementioned solvents.

12. The system in accordance with claim 1, wherein the system is a security article selected from the group consisting of banknotes, checks, bank and credit cards, check cards, passports, chip cards, driving licences, verification certificates, entrance tickets, stamps, train and airplane tickets, telephone carts and seals.

13. A method for preparing a system in accordance with claim 1, which comprises the following steps:
   a) providing a substrate,
   b) applying a first ink on at least a part of at least one surface of the substrate, wherein the first ink includes at least one IR luminescent dye and/or at least one IR luminescent pigment, and
   c) applying a second non-luminescent ink on at least a part of at least one surface of the substrate, wherein the second ink includes at least one non-luminescent IR absorbing pigment and/or a least one non-luminescent IR absorbing dye, wherein the IR emission spectrum of the first ink and the absorption spectrum of the second ink at least partially overlap,
   wherein the first and second inks are applied in steps b) and c) so that the first ink and the second ink at least partially overlap, wherein the second ink is applied in the overlapping area onto the first ink.

14. A method for evaluating the genuineness of a security document comprising a system in accordance with claim 1 comprising the steps of irradiating the security document with at least one wavelength being able to excite the IR luminescent dye and/or IR luminescent pigment included in the first ink and measuring the emission of the system at at least one wavelength, at which the IR luminescent dye and/or IR luminescent pigment included in the first ink emits IR radiation.

15. The method in accordance with claim 14, wherein at least a part of the measurement of the emission of the system is made during at least a part of the time period, during which the security document is irradiated, and the whole measurement of the emission is made during the time period, during which the security document is irradiated.

16. The method in accordance with claim 14, wherein for measuring the emission of the system either:
   the emission is measured at two to ten different wavelengths, wherein at all of these wavelengths the at least one IR luminescent dye and/or the at least one IR luminescent pigment included in the first ink emits IR radiation, and wherein at at least one of these wavelengths the non-luminescent IR absorbing pigment and/ or a least one non-luminescent IR absorbing dye absorbs IR radiation, or
   an emission spectrum is measured for a wavelength range of at least 950 to 1,050 nm, or
   the security document is irradiated with at least two different excitation wavelengths each of which being able to excite the IR luminescent dye and/or IR luminescent pigment included in the first ink and wherein the emission of the system is measured at one wavelength, at which the IR luminescent dye and/or IR luminescent pigment included in the first ink emits IR radiation.

* * * * *